US012634203B2

(12) United States Patent
Vasseur et al.

(10) Patent No.: US 12,634,203 B2
(45) Date of Patent: May 19, 2026

(54) GENERATIVE MODELS TO CREATE NETWORK CONFIGURATIONS THROUGH NATURAL LANGUAGE PROMPTS

(71) Applicant: Cisco Technology, Inc., San Jose, CA (US)

(72) Inventors: Jean-Philippe Vasseur, Combloux (FR); Mukund Yelahanka Raghuprasad, San Jose, CA (US); Grégory Mermoud, Venthône (CH)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 18/376,625

(22) Filed: Oct. 4, 2023

(65) Prior Publication Data

US 2025/0119354 A1 Apr. 10, 2025

(51) Int. Cl.
| | |
|---|---|
| *G06F 15/173* | (2006.01) |
| *H04L 41/084* | (2022.01) |
| *H04L 41/12* | (2022.01) |
| *H04L 41/14* | (2022.01) |
| *H04L 41/147* | (2022.01) |
| *H04L 41/149* | (2022.01) |

(52) U.S. Cl.
CPC .......... *H04L 41/12* (2013.01); *H04L 41/0846* (2013.01); *H04L 41/145* (2013.01); *H04L 41/147* (2013.01); *H04L 41/149* (2022.05)

(58) Field of Classification Search
CPC .............................. H04L 41/142; H04L 41/16
See application file for complete search history.

(56) References Cited

U.S. PATENT DOCUMENTS

| | | | |
|---|---|---|---|
| 11,165,648 B1 * | 11/2021 | Bollineni | ............ H04L 41/0869 |
| 11,314,630 B1 * | 4/2022 | Perumal | .............. G06F 11/3688 |
| 2021/0271968 A1 | 9/2021 | Ganin et al. | |
| 2021/0306873 A1 | 9/2021 | Mokrushin et al. | |
| 2022/0231912 A1 | 7/2022 | Jeong et al. | |
| 2023/0022050 A1 * | 1/2023 | Fong | ................... G06F 11/3688 |
| 2023/0214453 A1 | 7/2023 | Santhar et al. | |
| 2025/0088946 A1 * | 3/2025 | Grida Ben Yahya | ... H04L 41/16 |

FOREIGN PATENT DOCUMENTS

CN          116545854 A          8/2023

OTHER PUBLICATIONS

Ferriol-Galmes, et al., "Building a Digital Twin for network optimization using Graph Neural Networks", Computer Networks, vol. 217, 2022, 14 pages.

* cited by examiner

*Primary Examiner* — Padma Mundur
(74) *Attorney, Agent, or Firm* — Lee & Hayes, P.C.

(57) ABSTRACT

In one implementation, a device obtains a natural language-based description of a network via a user interface. The device generates, based on the natural language-based description, network configuration parameters for the network using a generative model. The device conducts a simulation of traffic in the network using the network configuration parameters, to obtain telemetry data. The device uses the telemetry data to train a machine learning model to perform network analytics.

20 Claims, 10 Drawing Sheets

500

NETWORK CONFIGURATION GENERATOR PROCESS 249

| NETWORK CONFIGURATION EXTRACTOR 502 | NETWORK CONFIGURATION DESCRIPTOR 504 | GENERATIVE MODEL 506 |
| USER INTERFACE MODULE 508 | REINFORCEMENT LEARNING ENGINE 510 | NETWORK MODEL TRAINING MODULE 512 |

NETWORK CONTROLLER 514

USER INTERFACE 516

800

805

START

810

OBTAIN NATURAL LANGUAGE-BASED
DESCRIPTION OF NETWORK

815

GENERATE NETWORK CONFIGURATION PARAMETERS

820

CONDUCT SIMULATION USING PARAMETERS

825

USE SIMULATION TELEMETRY TO TRAIN MODEL

830

END

GENERATIVE MODELS TO CREATE NETWORK CONFIGURATIONS THROUGH NATURAL LANGUAGE PROMPTS

TECHNICAL FIELD

The present disclosure relates generally to generative models to create network configurations through natural language prompts.

BACKGROUND

Generalization in machine learning refers to the ability of a model to adapt well over a diverse set of scenarios, while still maintaining a high level of performance. In the context of computer networking, a model that can generalize well can be crucial for systems that deal with use cases like what-if analysis, anomaly detection, troubleshooting etc. For example, a well-generalized model for anomaly detection can identify the malicious anomalies that are subtle in nature, while also avoiding false positives.

The most direct approach to achieving generalization is to expose the model to a diverse training set. However, this is largely impractical as computer networks are highly complex systems and events such as link failures and other disruptions are rare in well-designed networks unless exposed to very specific circumstances. In addition, the more examples of such disruptions there are in the training data, the better the ability of the resulting model to predict and avoid these disruptions.

While it may be possible to simulate network telemetry for purposes of model training, instead of relying on telemetry collected from real-world networks, the complexities of modern networks also make this approach impractical. Indeed, simply randomizing the configuration parameters for simulation could lead to configurations that are not realistic or may not represent the prominent aspects of real-world telemetry. This means that not only would simulating network telemetry for model training require the intervention of a network expert, but could also be too cumbersome of a task to lead to a model that is sufficiently generalized for deployment across different networks.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

Figure 1A:
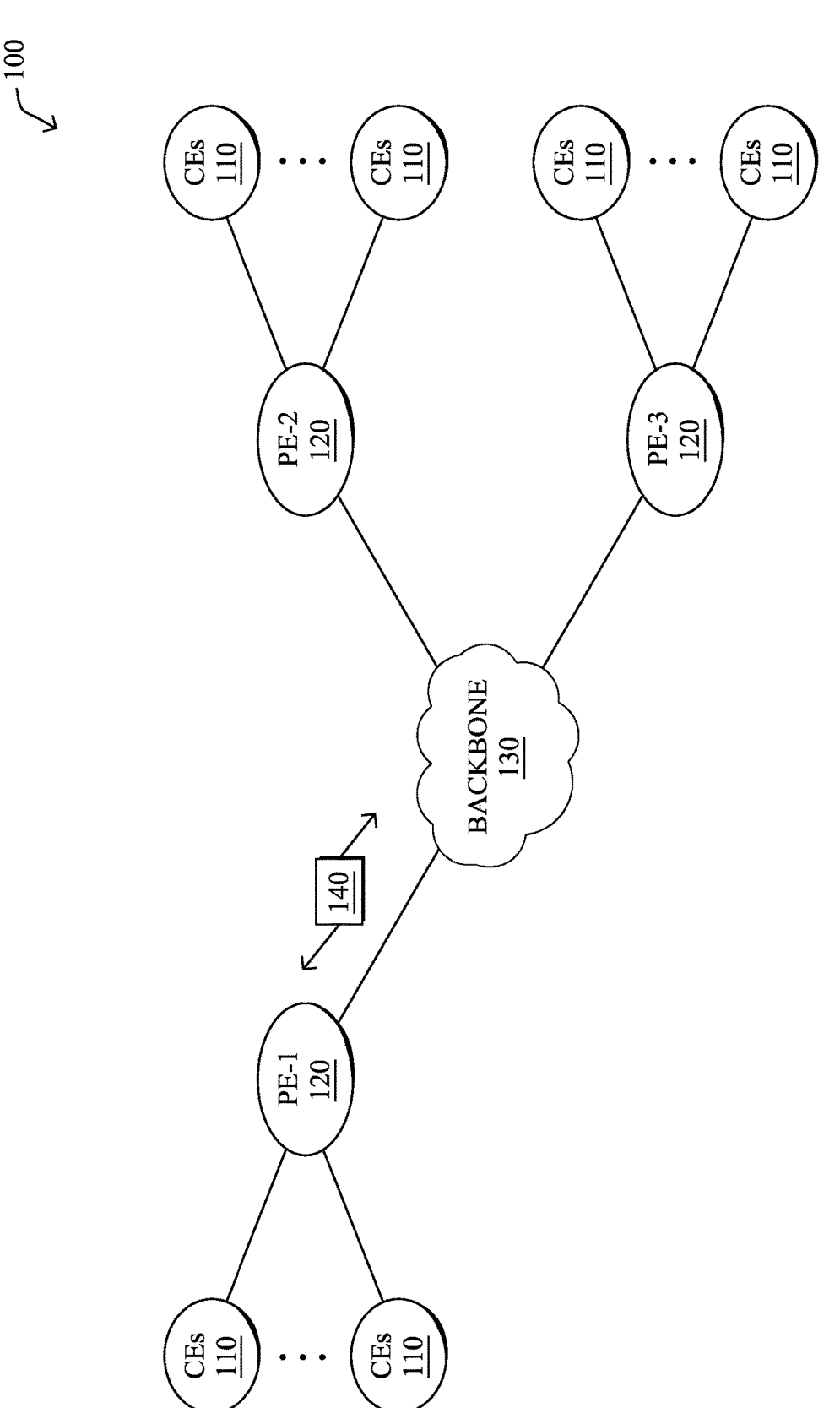
FIGS. 1A-1B illustrate an example communication network.

According to one or more implementations of the disclosure, a device obtains a natural language-based description of a network via a user interface. The device generates, based on the natural language-based description, network configuration parameters for the network using a generative model. The device conducts a simulation of traffic in the network using the network configuration parameters, to obtain telemetry data. The device uses the telemetry data to train a machine learning model to perform network analytics.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
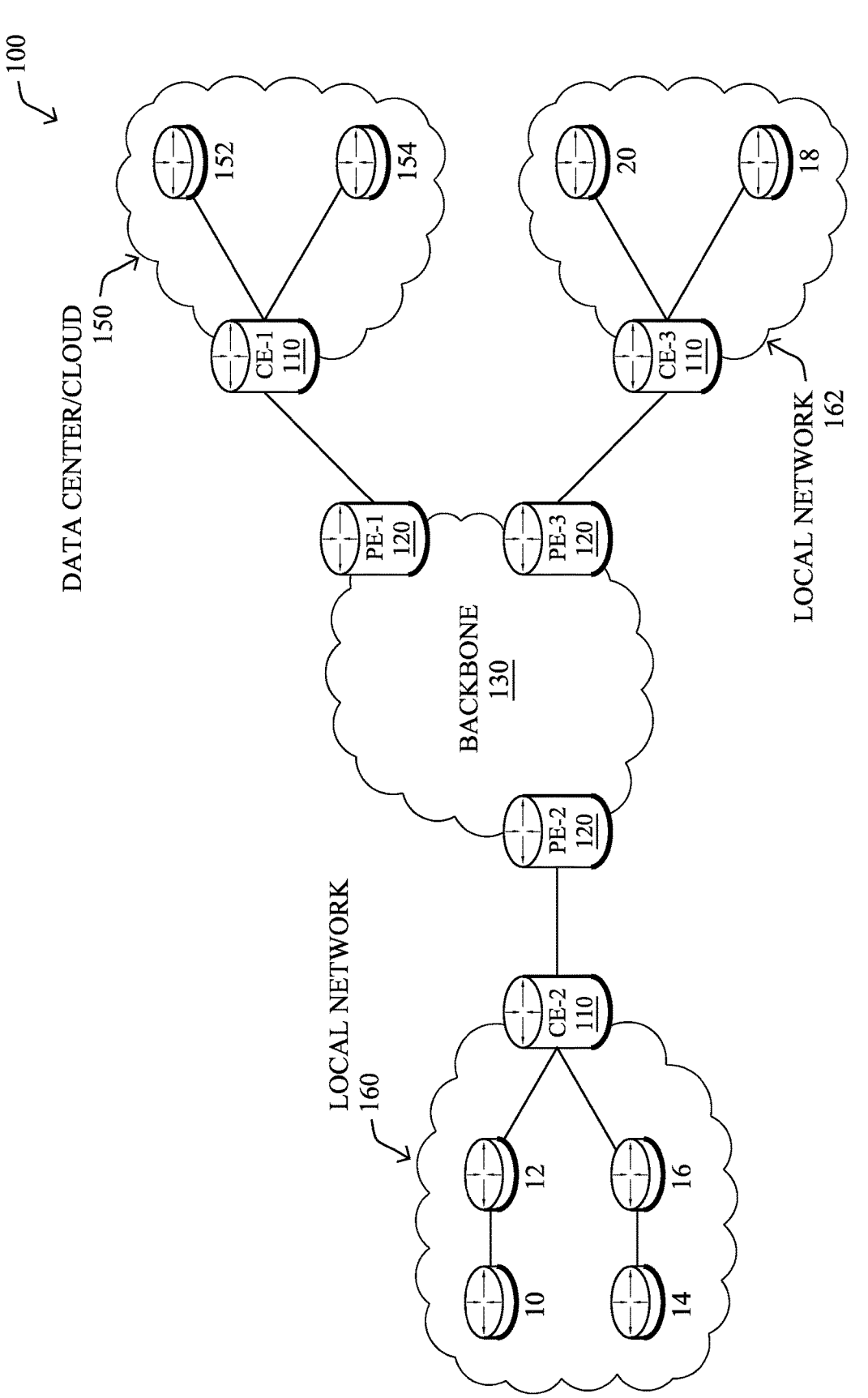

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
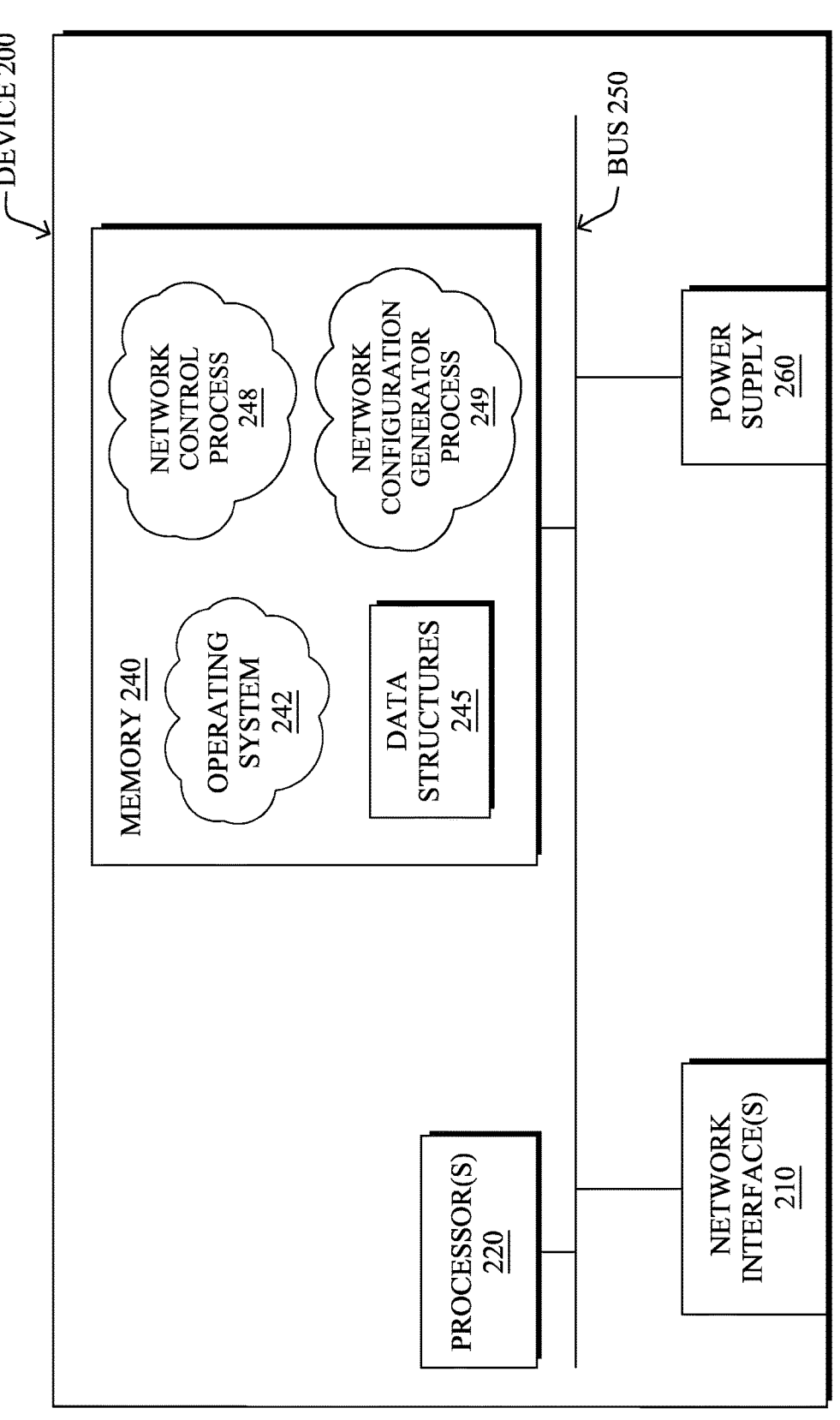
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or a network configuration generation process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, network control process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network control process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, network control process 248 and/or network configuration generation process 249 may include computer executable instructions that, when executed by processor(s) 220, cause device 200 to perform the techniques described herein. To do so, in some implementations, network control process 248 and/or network configuration generation process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, network control process 248 and/or network configuration generation process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or network configuration generation process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network control process 248 and/or network configuration generation process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
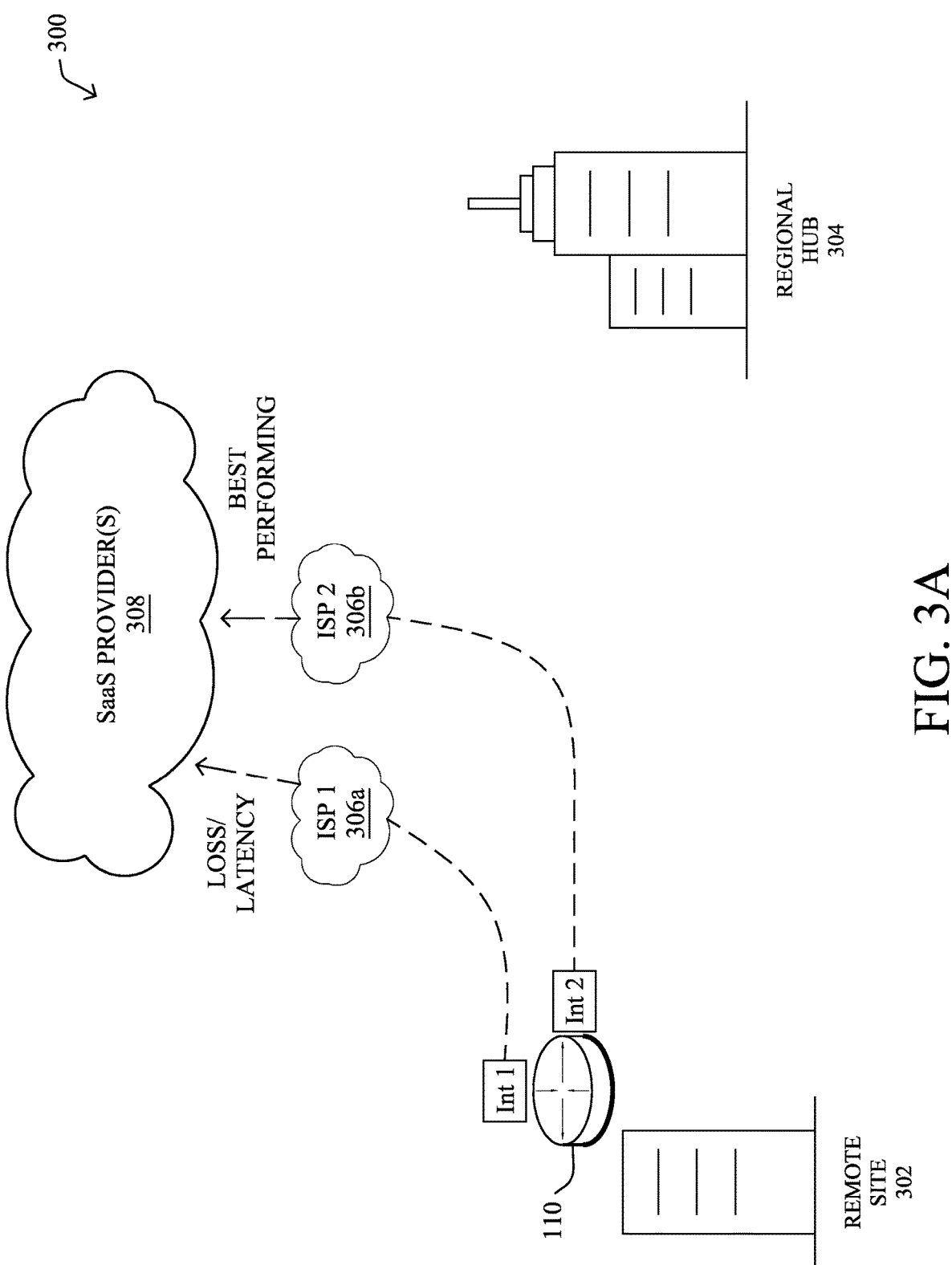
FIGS. 3A-3B illustrate example network deployments.
Figure 3B:

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
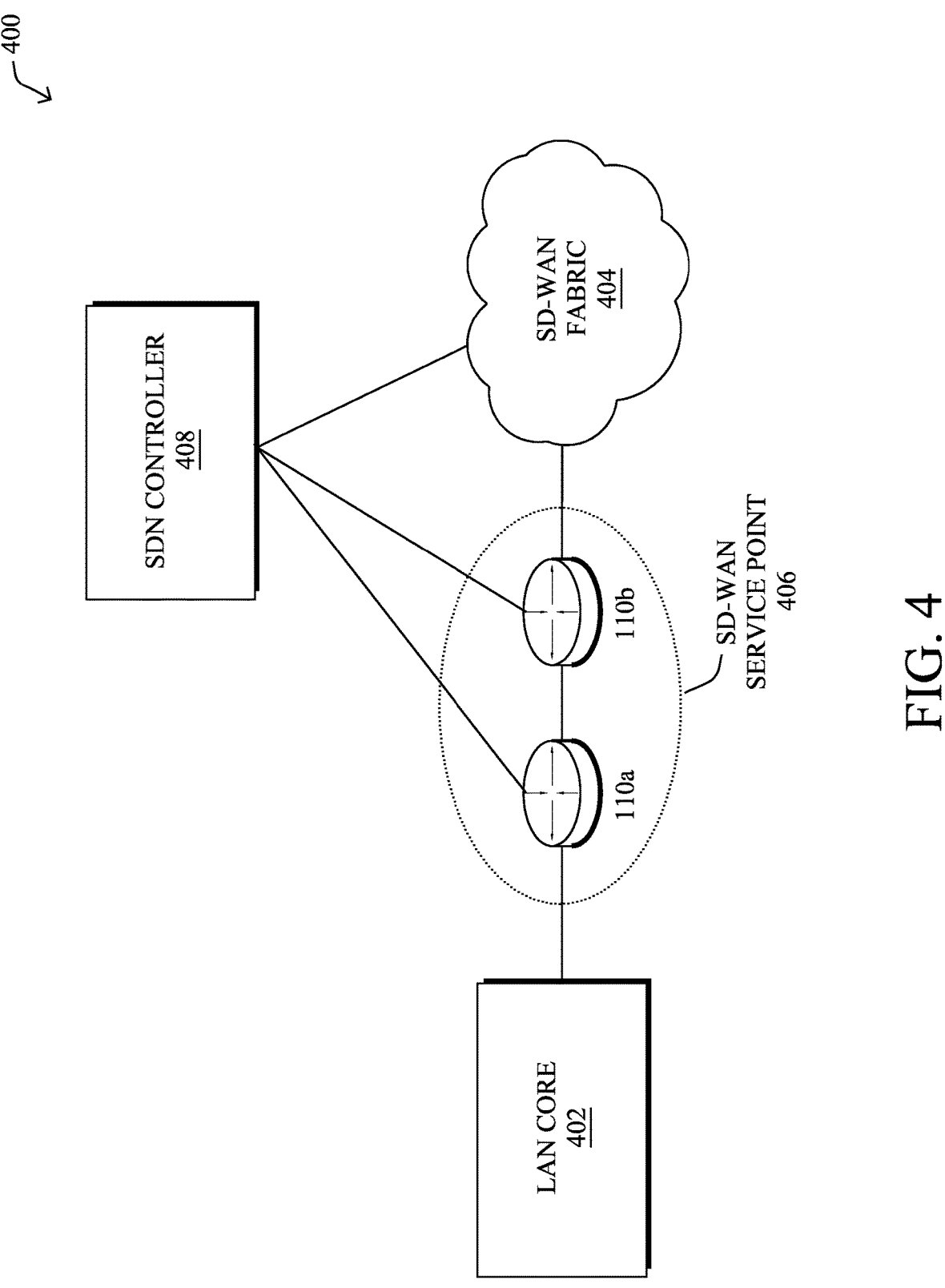
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

As noted above, generalization in machine learning is the ability of a model to adapt well over a diverse set of scenarios, while still maintaining a high level of performance. In the context of computer networking, a model that can generalize well can be crucial for systems that deal with use cases like what-if analysis, anomaly detection, troubleshooting etc. For example, a well-generalized model for anomaly detection can identify the malicious anomalies that are subtle in nature, while also avoiding false positives. The most direct approach to achieving generalization is to expose the model to a diverse training set. However, in the real world, telemetry from most enterprise networks may not contain significant diversity. For example, link failures and other disruptions are considered a rare event in enterprise networks that are well designed, unless exposed to very specific circumstances. It is also true that having more examples of such disruptions in the training data would help a predictive system forecast better and avoid such disruptions.

Considering the limited nature of real-world network telemetry and the need for more diversity, one could consider using simulated telemetry for purposes of model training. Simulation software like Network Simulator 3 (NS3), OMNET++, and the like, could be configured to produce telemetry from a digital network (as opposed to the usual approach consisting in gathering telemetry from "live," potentially less diverse networks). This telemetry is close in behavior to the real-world telemetry, while allowing for the user to inject disruptions such as link-failures at a much higher frequency in a diverse set of scenarios. Furthermore, systems trained on simulated telemetry have been shown to generalize well on unseen topology/configuration for tasks like modeling network digital twins.

While simulations can be configured to produce telemetry of any required scenario, it can be quite tedious to manually input every aspect of the network configuration to create a realistic customer network. In addition, simply randomizing the configuration parameters could lead to configurations that are not realistic or may not represent the prominent aspects of real-world telemetry. Such telemetry consumed as training data can then lead to an inability of the resulting model to model realistic network behaviors.

Generative Models to Create Network
Configurations Through Natural Language Prompts The techniques introduced herein propose a system by which a user can generate a diverse set of realistic network configurations that can then be used as input to a mechanism that simulates traffic flows in a network. In some aspects, the system is capable of processing natural language specifications as input and generating configurations that follow the specification. An example natural language input could be something like the following:

"Hub-spoke topology with 3 hubs. 2 hubs located in the USA and 1 hub in Brazil"

Based on such an input, the system generates network configurations that follow the user specification while also generating realistic values for other aspects of the configuration that were not specified, thus making the tasks significantly less tedious than with a traditional simulator requiring every detail of the configurations to be specified. In further aspects, the system can be trained in the usual offline fashion or be trained in an online fashion, where the user can adjust/update the configurations generated and these corrections are then used as feedback for reinforcement learning. The natural language interface eliminates the need for careful construction of configurations and faster workflows.

Illustratively, the techniques described herein may be performed by hardware, software, and/or firmware, such as in accordance with network configuration generation process 249, which may include computer executable instructions executed by the processor 220 (or independent processor of interfaces 210) to perform functions relating to the techniques described herein, such as in conjunction with network control process 248.

Specifically, according to various implementations, a device obtains a natural language-based description of a network via a user interface. The device generates, based on the natural language-based description, network configuration parameters for the network using a generative model. The device conducts a simulation of traffic in the network using the network configuration parameters, to obtain telemetry data. The device uses the telemetry data to train a machine learning model to perform network analytics.

Figure 5:
FIG. 5 illustrates an example architecture for using generative models to create network configurations through natural language prompts.

Operationally, FIG. 5 illustrates an example architecture 500 for using generative models to create network configurations through natural language prompts, according to various implementations. At the core of architecture 500 is network configuration generation process 249, which may be executed by a controller for a network or another device in communication therewith. For instance, network configuration generation process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, network configuration generation process 249 may interface with a network controller 514, either locally or via a network (e.g., via one or more APIs, etc.).

As shown, network configuration generation process 249 may include any or all of the following components: a network configuration extractor 502, a network configuration descriptor 504, a generative model 506, a user interface model 508, a reinforcement learning engine 510, and/or a network model training module 512. As would be appreciated, the functionalities of these components may be combined or omitted, as desired. In addition, these components may be implemented on a singular device or in a distributed manner, in which case the combination of executing devices can be viewed as their own singular device for purposes of executing network configuration generation process 249.

In various implementations, network configuration generation process 249 may operate in two phases: a training phase and an inference phase. During this training phase, as described below, generative model 506 may be trained to take as input the natural language description/prompt of the required configuration and produce one or more realistic network configurations as output. Then, during the inference phase, network configuration generation process 249 may use generative model 506 to provide users with the corresponding network configurations. In some instances, the inference phase may also entail leveraging reinforcement learning using reinforcement learning engine 510 that updates generative model 506 with feedback on the generated configurations.

Figure 6:
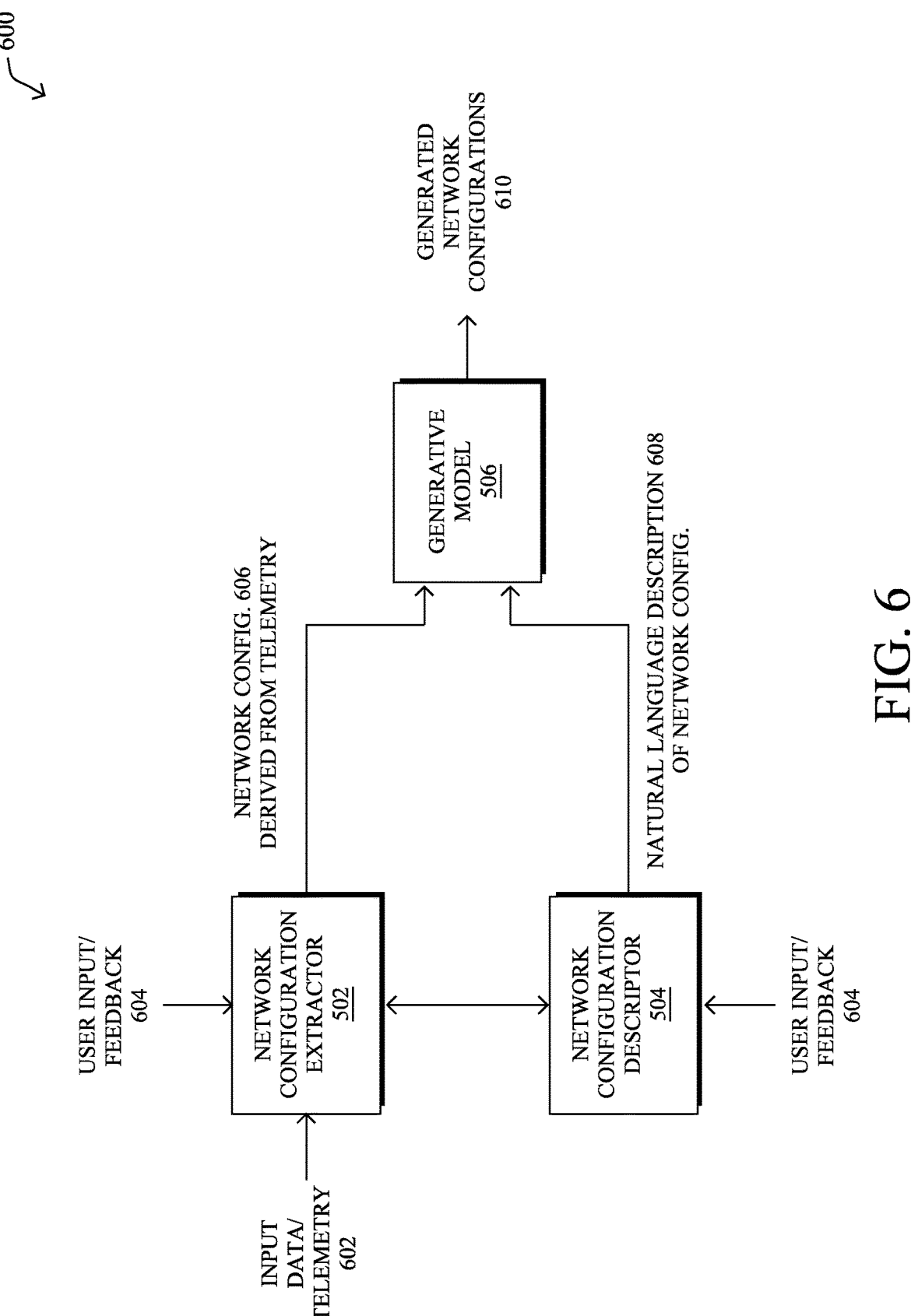
FIG. 6 illustrates an example training phase for the architecture of FIG. 5.

FIG. 6 illustrates an example training phase 600 for the architecture of FIG. 5. To perform the techniques introduced herein, generative model 506 first needs to be trained such that it associates natural language descriptions of network entities to a specific network configuration. To this end, the training data for such a task should include the network configuration(s) as well as their natural language description (s). In various implementations, this information can be provided either directly or can be derived from network telemetry of any number of live networks. Training phase 600 illustrates the case in which the network configuration (s) are derived automatically from the example network(s). However, it should be appreciated that this information can also be provided manually, such as via a user interface or the like.

In training phase 600, the system uses network configuration extractor 502 and network configuration descriptor 504 to derive the training data for generative model 506. Once the network configuration 606 and its natural language description 608 is extracted from the telemetry, the system can train generative model 506. The input telemetry used in the training phase should contain information that can be used to extract the network configuration parameters such as network topology, traffic flow, routing matrices, etc.

Network configuration extractor 502 takes in as input the network telemetry 602 and/or other data from the network, to produce as output the network configuration 606 for that network. In general, network configuration 606 describes the various aspects of the network such as the topology matrix, routing matrix, traffic matrix, queue weights and policies, packet size distributions, etc. In some implementations, network configuration extractor 502 only computes those configuration variables for which network configuration 606 has information. In turn, if network telemetry 602 does not contain any information about certain aspects of the configuration of the existing network, the user can choose to input them or leave it blank via a user interface (e.g., user interface 516 in FIG. 5) by providing user input/feedback 604. In some cases, network configuration extractor 502 may also extract from network telemetry 602 the non-configuration information such as the type of topology, service-providers networks, device locations, etc., Such information can serve as metadata to the configurations and helps capture other relevant concepts.

In one implementation, as noted, a user may provide the mapping of the various fields in network telemetry 602 via user input/feedback 604 that correspond to various network entities/configuration variables. For example, consider one of the sources of network telemetry 602 to be the Bidirectional Forwarding Detection (BFD) telemetry in SD-WAN networks, which may include metrics like latency, loss, or jitter associated with the various SD-WAN tunnels. In this example, the user may identify the telemetry fields that are associated with particular devices/network nodes, interfaces, network-level metrics, etc. Once the required fields are identified, network configuration extractor 502 may process network telemetry 602 using pre-defined functions that extract network configuration parameters like the Routing Matrix, latency distributions, or packet loss distributions. The predefined function may take only one source of telemetry as input or multiple sources of telemetry. For example, BFD can be used with Deep Packet inspection (DPI) telemetry which contains information of application traffic over various tunnels in the network.

In another implementation, the user can also provide via user input/feedback 604 own processing functions and the granularity of processing to extract the network configuration parameters. In yet another implementation, the user can input simplified, pre-aggregated information about the network. Such information is generally computed for the sake of monitoring dashboards and other visibility use cases.

Network configuration extractor 502 can then take the aggregated information and extract the network configuration parameters. In other instances, as noted, the user can also input the network configuration parameters directly via user input/feedback 604 without having to extract them from telemetry 602. Regardless, network configuration 606 extracted by network configuration extractor 502 serves as the ground truth for what "realistic" network configurations should look like as part of the training of generative model 506.

Network configuration descriptor 504 uses the configurations parameters and the non-configuration information in network configuration 606 derived by network configuration extractor 502 to generate or otherwise associate with them their corresponding natural language description 608. In one implementation, network configuration descriptor 504 can generate the natural language description 608 in a deterministic manner, by stating all the entities and its corresponding numeric value. For example, given the network configuration parameters as input, the description could be something like:

"Hub-spoke topology with 19 edge-devices, 32 tunnels, 4 unique applications, average 4% packet loss, average 100 ms latency, . . . "

Network configuration descriptor 504 can generate such natural language descriptions 608 deterministically by collating the information corresponding to various network entities. In other cases, network configuration descriptor 504 may include a large language model (LLM) to generate natural language description 608 that takes as input tabular/well-defined configuration information. In other cases, network configuration descriptor 504 may be defined by the user via user input/feedback 604 to produce just one or multiple descriptions in various styles, containing distinct pieces of information. Such varied training data helps generative model 506 to be more robust to the possible variations in user input prompts during its inference phase.

Typically, generative model 506 has two modes of function. During training phase 600, generative model 506 takes as input network configuration 606 and natural language description 608 as the two inputs and learns to reconstruct the network configuration information, given a natural language description of a network from a user. More specifically, in the inference phase, generative model 506 takes the user input in natural language format and generates the network configurations 610 that is relevant to description provided by the user. It is to be noted that generative model 506 generates a "complete" network configuration 610 that can be provided directly as input to simulation systems. In addition, any aspect of the configuration not described in the user input may also be generated by generative model 506. For example, consider a user input prompt of:

"Generate a configuration for a hub-spoke topology with 12 edge-devices and 24 tunnels, where the devices are located in Asia"

Given such an input prompt from a user, generative model 506 then creates the corresponding network configuration 610, while also assigning realistic values for parameters like latency and loss distribution such that they are realistic in the context of networks from Asia.

The training task of using two inputs, while providing as output the network configurations, helps generative model 506 associate a natural language description with the specific network configuration parameters. Considering that the network configurations are extracted from real networks, the training enables generative model 506 to output "realistic" network configurations 610. In one implementation, generative model 506 could belong to the class of diffusion models which are widely used for text to image generative models. In other implementations, generative model 506 could take the form of a pretrained LLM. Here, the LLM could be fine-tuned on the training data consisting of the two inputs described earlier.

Figure 7:
FIG. 7 illustrates an example of reinforcement learning using the architecture of FIG. 5.
Figure 7:
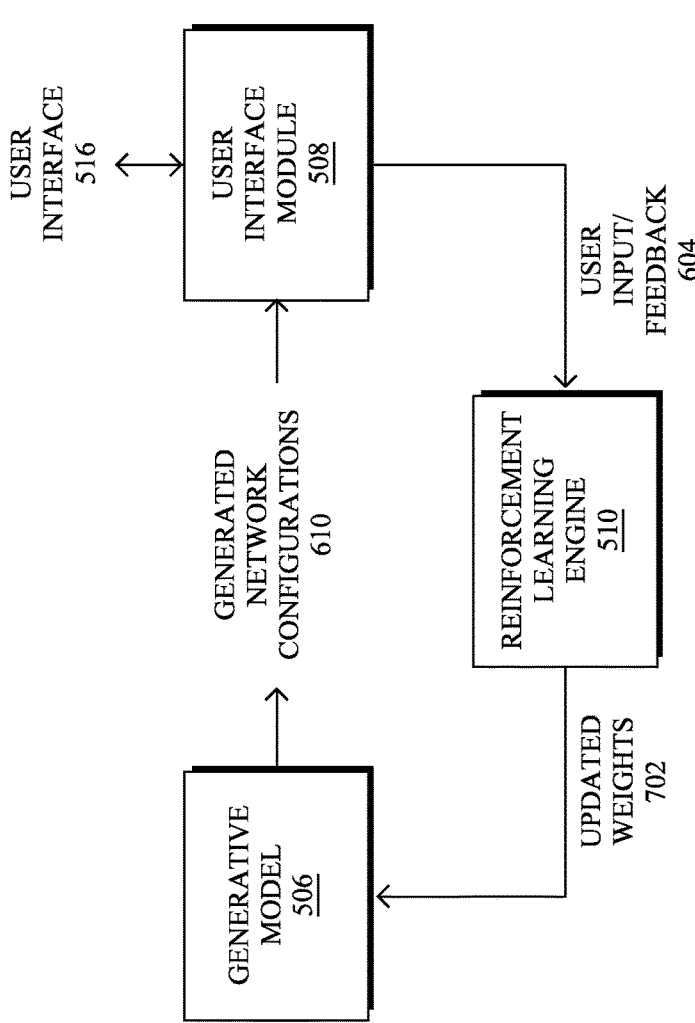

FIG. 7 illustrates an example 700 of reinforcement learning using the architecture of FIG. 5, in various implementations. Once generative model 506 is trained, such as via training phase 600, its inference phase of operation involves the actual usage of generative model 506 with reinforcement learning with human feedback (RLHF) using reinforcement learning engine 510.

The realistic network configurations 610 output by generative model 506 are displayed to the user via user interface model 508 for verifications/corrections through user interface 516. This allows the user to provide user input/feedback 604 back to the system regarding network configurations 610. The corrections made by the user can then be used as feedback for updating generative model 506 using reinforcement learning engine 510.

More specifically, user interface model 508 may display to the user the network configurations 610 generated by generative model 506. For instance, user interface model 508 may provide for display configuration parameters such as the queue policy, link policy etc., and described through text and parameters like the network topology, distributions for packet-size, packet intervals, etc. User interface model 508 also enables the user to easily make corrections to any of the parameters generated. Such corrections or updates can be tracked and can be used as human feedback for reinforcement learning.

Some examples of updates/corrections specified by the user of user interface 516 may include changing the topology through a simple graphical user interface (GUI), updating queue policies through a drop-down option, inputting the updated packet size distributions, or the like. User interface model 508 may also provide a mechanism to input the initial user prompt that is used to generate the network configuration. In one implementation, user interface model 508 may also provide a mechanism to input the amount of randomness/specificity for generative model 506. Increasing the randomness can direct generative model 506 to not conform to the training data to which generative model 506 was exposed.

As shown in FIG. 7, reinforcement learning engine 510 may track the changes/updates specified in user input/feedback 604 regarding network configurations 610 and, in turn, generate updated weights 702 to update generative model 506, accordingly. In turn, reinforcement learning engine 510 may rank the updates performed by the user, using only those that are necessary as feedback. In one implementation, reinforcement learning engine 510 may rank highly only that feedback that updates the generated network configurations 610 in a significant manner.

In another implementation, reinforcement learning engine 510 may rank the feedback depending on model uncertainty measures. For instance, reinforcement learning engine 510 may rank certain feedback lower when reinforcement learning engine 510 is more confident of the generated configurations. Conversely, when network configurations 610 have a high model uncertainty, reinforcement learning engine 510 may rank the user provided feedback higher. One important factor that determines the model uncertainty is the degree to which generative model 506 was exposed to the type of network configurations 610 that are generated. For example, a model trained only on networks located in the Americas may be under-confident of the configurations 610 generated for networks located in Asia. In such a case, reinforcement learning engine 510 may rank the feedback regarding network configurations 610 higher.

Referring again to FIG. 5, network configuration generation process 249 may use the finalized network configurations 610 generated by generative model 506 as input to network model training module 512. During execution network model training module 512 may use the network configurations 610 to perform network simulations, such as in one or more real networks (e.g., via network controller 514) or in a network simulation environment. In turn, network model training module 512 may collect the telemetry data that results from the simulation and use that telemetry data as training data in order to train a machine learning model for that network. For instance, such a model may be trained to predict changes or failures in a network, detect anomalies, perform automated configuration changes (e.g., routing decisions, etc.), or the like.

Figure 8:
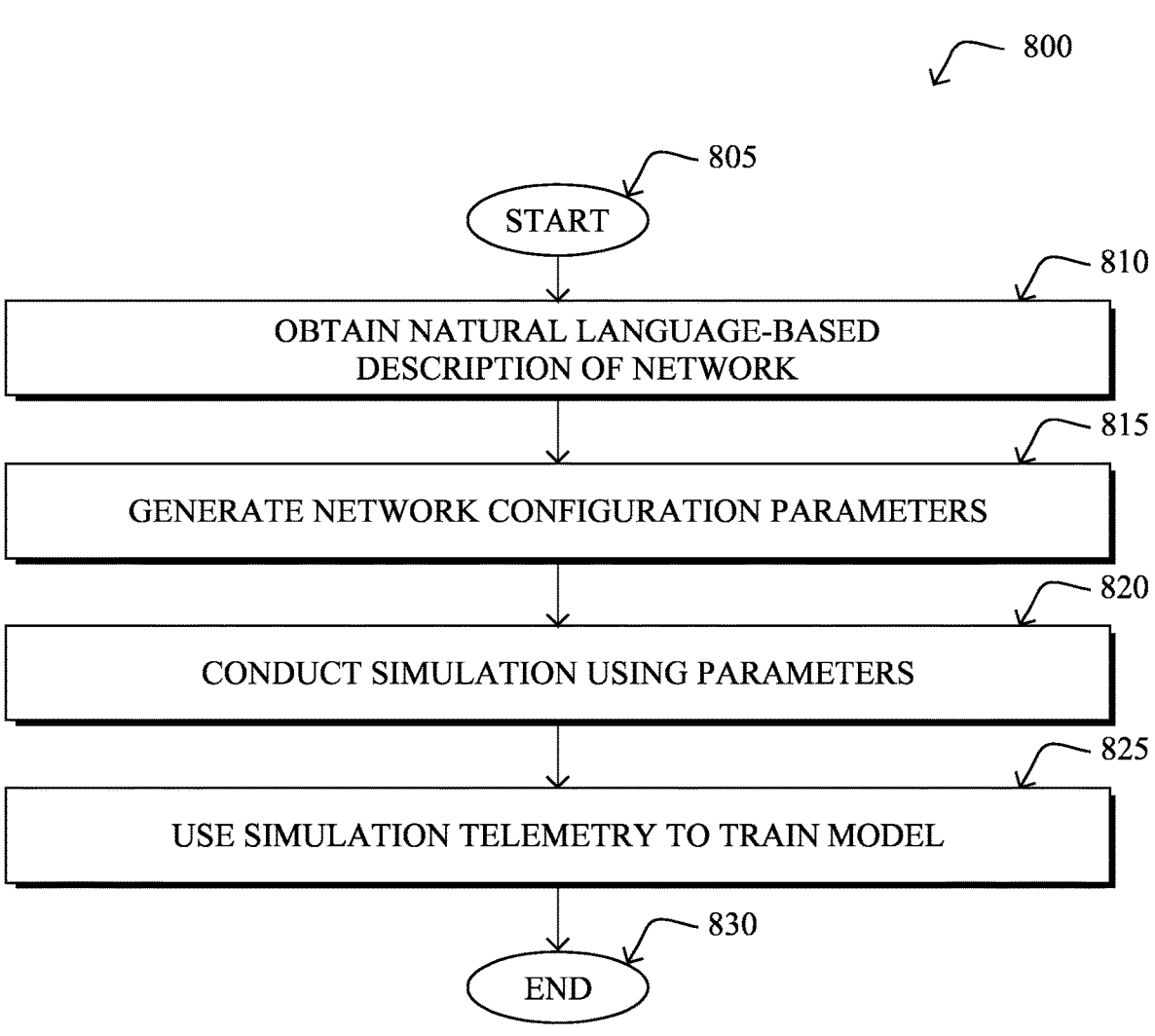
FIG. 8 illustrates an example simplified procedure for using generative models to create network configurations through natural language prompts.

FIG. 8 illustrates an example simplified procedure 800 (e.g., a method) for using generative models to create network configurations through natural language prompts, in accordance with one or more implementations described herein. For example, a non-generic, specifically configured device (e.g., device 200), such as a router, firewall, controller for a network (e.g., an SDN controller or other device in communication therewith), server, or the like, may perform procedure 800 by executing stored instructions (e.g., network configuration generation process 249 and/or network control process 248). The procedure 800 may start at step 805, and continues to step 810, where, as described in greater detail above, the device may obtain a natural language-based description of a network via a user interface. In some implementations, the natural language-based description of the network indicates a topology of the network.

At step 815, as detailed above, the device may generate, based on the natural language-based description, network configuration parameters for the network using a generative model. In one implementation, the generative model comprises a large language model. In some implementations, the natural language-based description of the network indicates a geographic location of the network and the network configuration parameters are based in part on the geographic location. In various implementations, the network configuration parameters comprise a latency or loss distribution for the network. In one implementation, the device may generate the network configuration parameters by mapping telemetry data from one or more other networks to the network configuration parameters. In one implementation, the generative model is trained to associate the network configuration parameters for the one or more other networks to natural language-based descriptions for the one or more other networks.

At step 820, the device may conduct a simulation of traffic in the network using the network configuration parameters, to obtain telemetry data, as described in greater detail above. In various implementations, the device may do so by sending a command to a network controller for real network or by sending control commands to a simulation system.

At step 825, as detailed above, the device may use the telemetry data to train a machine learning model to perform network analytics. In various implementations, the device may also deploy the machine learning model for execution by a network controller or networking device. In further implementations, the device may also receive user feedback from the user interface regarding the network configuration parameters and use reinforcement learning to refine the network configuration parameters based on the user feedback. In some implementations, the network analytics comprise at least one of: performing network anomaly detection, performing network what-if analysis, or performing network troubleshooting, or performing network predictions.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for generative models to create network configurations through natural language prompts, it is to be understood that various other adaptations and modifications may be made within the spirit and scope of the implementations herein. For example, while certain implementations are described herein with respect to using certain models for purposes of predicting application experience metrics, SLA violations, or other disruptions in a network, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:
   obtaining, by a device, a natural language-based description of a network via a user interface, the natural language-based description comprising one or more user specified aspects of the network;
   inputting, by the device, the natural language-based description into a generative model trained to create network configurations from natural language-based descriptions; and
   generating, by the device and using the generative model based on the natural language-based description, network configuration parameters for the network, wherein the generative model generates realistic values for one or more non-specified aspects from the natural language-based description of the network in order to generate the network configuration parameters.

2. The method as in claim 1, wherein the generative model comprises a large language model.

3. The method as in claim 1, wherein the natural language-based description of the network indicates a geographic location of the network, and wherein the network configuration parameters are based in part on the geographic location.

4. The method as in claim 1, wherein generating the network configuration parameters comprises:

receiving user feedback from the user interface regarding the network configuration parameters; and using reinforcement learning to refine the network configuration parameters based on the user feedback.

5. The method as in claim 1, wherein the network configuration parameters comprise a latency or loss distribution for the network.

6. The method as in claim 1, wherein generating the network configuration parameters comprises:

mapping previously collected telemetry data from one or more other networks to the network configuration parameters and wherein the generative model is trained to associate the network configuration parameters for the one or more other networks to natural language-based descriptions for the one or more other networks.

7. The method as in claim 1, further comprising:

conducting, by the device, a simulation of traffic in the network using the network configuration parameters, to obtain telemetry data; and using, by the device, the telemetry data to train a machine learning model to perform network analytics.

8. The method as in claim 7, further comprising:

deploying, by the device, the machine learning model for execution by a network controller or networking device.

9. The method as in claim 7, wherein the network analytics comprise at least one of:

performing network anomaly detection, performing network what-if analysis, or performing network troubleshooting, or performing network predictions.

10. The method as in claim 1, wherein the natural language-based description of the network indicates a topology of the network.

11. An apparatus, comprising:

one or more network interfaces;

a processor coupled to the one or more network interfaces and configured to execute one or more processes; and a memory configured to store a process that is executable by the processor, the process when executed configured to:

obtain a natural language-based description of a network via a user interface, the natural language-based description comprising one or more user specified aspects of the network;

input the natural language-based description into a generative model trained to create network configurations from natural language-based descriptions; and generate, using the generative model and based on the natural language-based description, network configuration parameters for the network, wherein the using a generative model generates realistic values for one or more non-specified aspects from the natural language-based description of the network in order to generate the network configuration parameters.

12. The apparatus as in claim 11, wherein the generative model comprises a large language model.

13. The apparatus as in claim 11, wherein the natural language-based description of the network indicates a geographic location of the network, and wherein the network configuration parameters are based in part on the geographic location.

14. The apparatus as in claim 11, wherein the apparatus generates the network configuration parameters by:

receiving user feedback from the user interface regarding the network configuration parameters; and using reinforcement learning to refine the network configuration parameters based on the user feedback.

15. The apparatus as in claim 11, wherein the network configuration parameters comprise a latency or loss distribution for the network.

16. The apparatus as in claim 11, wherein the apparatus generates the network configuration parameters by:

mapping previously collected telemetry data from one or more other networks to the network configuration parameters and wherein the generative model is trained to associate the network configuration parameters for the one or more other networks to natural language-based descriptions for the one or more other networks.

17. The apparatus as in claim 11, further comprising:

conducting a simulation of traffic in the network using the network configuration parameters, to obtain telemetry data; and using the telemetry data to train a machine learning model to perform network analytics.

18. The apparatus as in claim 17, wherein the process when executed is further configured to:

deploy the machine learning model for execution by a network controller or networking device.

19. The apparatus as in claim 17, wherein the network analytics comprise at least one of:

performing network anomaly detection, performing network what-if analysis, or performing network troubleshooting, or performing network predictions.

20. A tangible, non-transitory, computer-readable medium storing program instructions that cause a device to execute a process comprising:

obtaining, by the device, a natural language-based description of a network via a user interface, the natural language-based description comprising one or more user specified aspects of the network;

inputting, by the device, the natural language-based description into a generative model trained to create network configurations from natural language-based descriptions; and generating, by the device and using the generative model based on the natural language-based description, network configuration parameters for the network, wherein the generative model generates realistic values for one or more non-specified aspects from the natural language-based description of the network in order to generate the network configuration parameters.

* * * * *